Aug. 11, 1931.  L. STADELHOFER  1,817,950

VAPOR TRAP

Filed Sept. 25, 1929

INVENTOR
Leslie Stadelhofer.
BY
Wm. H. Caufield,
ATTORNEY

Patented Aug. 11, 1931

1,817,950

UNITED STATES PATENT OFFICE

LESLIE STADELHOFER, OF NEWARK, NEW JERSEY

VAPOR TRAP

Application filed September 25, 1929. Serial No. 395,006.

This invention relates to an improved vapor trap for radiators as used in radiators of vacuum heating systems, and provides a trap which acts promptly in allowing the escape of water or the retention of steam.

The invention also relates to a trap which is easily regulated without detachment from the radiator as the valve mechanism can be adjusted from the outside.

A further object of the invention is to provide a trap that has a settling chamber in order that sand from the core, some of which sand remains in radiators after casting, also rust and other sediment developed in a radiator after use, is allowed to settle and is not carried by the water and lodged in the valve seat to hold the valve open and allow live steam to escape and be wasted.

Figure 1:
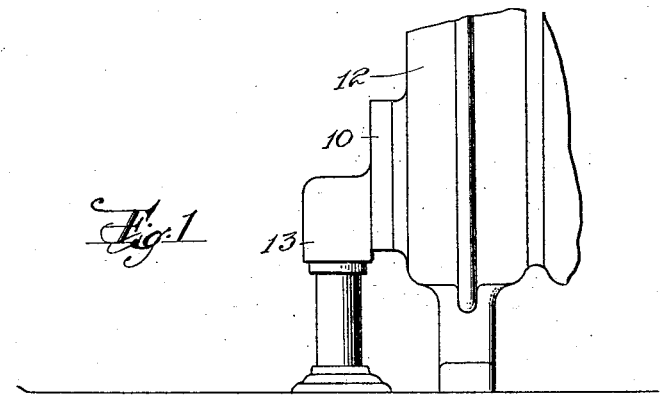
Figures 2, 3:
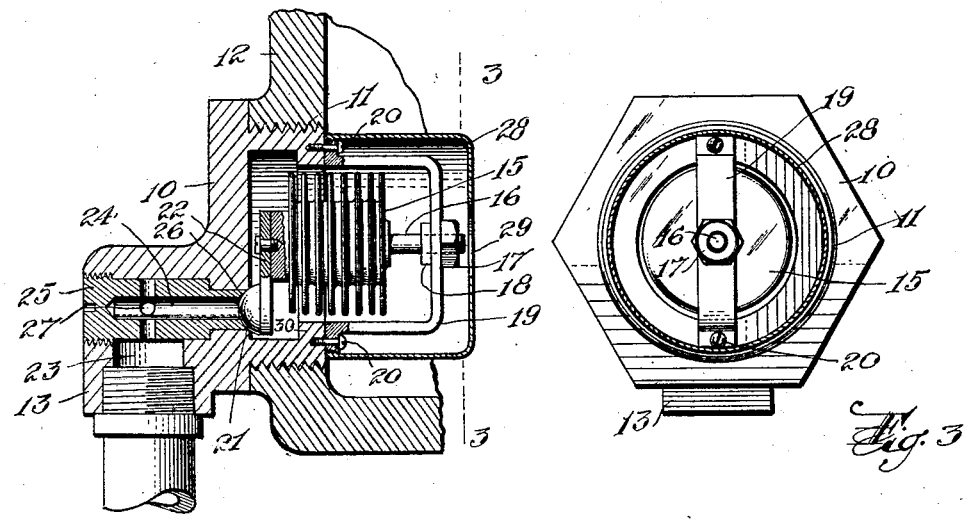
Figure 4:
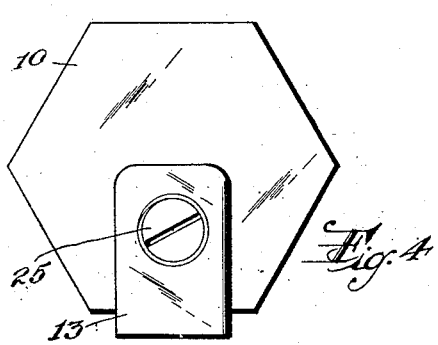

The invention is illustrated in the accompanying drawings, in which Figure 1 is a side view of my improved trap secured to a radiator. Figure 2 is a longitudinal section of the improved trap. Figure 3 is a section on line 3—3 in Figure 2. Figure 4 is an end view of the trap.

The trap comprises a casing 10 which has a screw-threaded boss 11 which screws into the opening in the standard radiator shown at 12 and thus acts as a drain for the water in the radiator due to condensation of the steam. The casing has a generally right angled form with an outlet part 13 to which the pipe 14 is secured. This pipe is connected with the vacuum apparatus of the system.

In the casing 10 I place a thermostatic member 15 which can be of any usual form and I illustrate the common bellows type of member which is usually provided with a small amount of volatile fluid and this thermostatic member is supported at its outer end and I show screw-threaded pin 16 with the nuts 17 and 18 for its adjustment on the bracket 19, which is secured to the inner face of the casing. I show the screws 20 as the fastening means for the bracket 19. On the other end of the thermostatic member I secure the valve 21. This valve is preferably made in the form of a dome and is opened on a short arm 22 from the thermostatic member so that it is lower than the thermostatic member so that the drain passage of the casing is arranged in the lower part thereof. This passage in the casing includes both the part 23 of the casing and the passage 24 in a screw 25. The screw 25 fits in the casing and extends through to engage the valve 21 at one end as the end of the screw is formed into a valve seat 26. The screw 25 being accessible from the outside can easily be operated by a tool to adjust the screw in its valve seat relative to the valve 21. The passage 24 through the screw is provided with multiple transverse openings 27 to insure communication between the part 24 and the passage 23 without regard to the rotative position of the screw 25.

On the inner end of the casing I secure a shield 28 which has an opening 29 placed a suitable distance above the bottom thereof, usually in the centre to allow access to the nut 17 and this shield, in conjunction with the flange 30 of the casing, forms a settling chamber so that water passing through the valve on its way to the outlet passage is detained and some particles of sand or rust are deposited on the bottom of the shield and are not carried to the valve. This overcomes one of the defects of the prior forms of valves which are often held open and thus not allowed to function in sealing the outlet part of the radiator by the lodgment of small grains of hard material on the valve or on the valve seat, particularly in valves that operate vertically on a horizontally arranged valve seat.

In my form of trap the horizontally operated valve is not apt to retain any such particles that might get to it which is also true of the valve seat 26.

Various changes can be made in the construction of the trap without departing from the scope of the invention.

I claim:—

1. A vapor trap comprising a casing having an inlet, a thermostatic member on said inlet end and a valve supported by the member, a screw passing into the casing and operable from the outside and having a passage therethrough, the screw having its end formed to provide a valve seat for the valve, the casing having an outlet communicating with the passage in the screw.

2. A vapor trap comprising a casing with an inlet at one end and adapted to fit into the wall of a radiator section, a thermostatic member supported on said inner end, the casing having an outlet passage, a valve influenced by the member for regulating the flow of fluid through the casing, a settling receptacle in which the member is disposed, the casing having the outlet passage arranged above the bottom of the said chamber.

3. A vapor trap comprising a casing with an inlet at one end and adapted to fit into the wall of a radiator section, a thermostatic member supported on said inner end, the casing having an outlet passage, a valve influenced by the member for regulating the flow of fluid through the casing, a settling receptacle in which the member is disposed, the casing having the outlet passage arranged above the bottom of the said chamber and a screw in said outlet passage and accessible from the outside with one end forming a seat for the valve and with a passage arranged longitudinally therein and cross-passages to communicate with the outlet of the casing.

4. A vapor trap comprising casing with a right angled passage therein, and having its exterior screw-threaded to fit into the wall of a radiator section, a thermostatic member secured on the inside of the valve and the part within the radiator, a valve actuated by the thermostat, and the outlet of the passage being arranged on the casing so as to be outside the radiator section.

In testimony whereof he affixes his signature.

LESLIE STADELHOFER.